United States Patent [19]

Nakagawa et al.

[11] Patent Number: 4,807,615
[45] Date of Patent: Feb. 28, 1989

[54] METHOD FOR ANESTHETIZING AQUATIC ANIMALS

[75] Inventors: Koichi Nakagawa, Kakogawa; Kazunori Imura, Takasago, both of Japan

[73] Assignee: Seitetsu Kagaku Co., Ltd., Washington, D.C.

[21] Appl. No.: 93,706

[22] Filed: Sep. 8, 1987

[51] Int. Cl.⁴ .............................................. A01K 63/00
[52] U.S. Cl. .................................... 128/203.12; 119/3
[58] Field of Search .......... 119/3; 128/200.25, 203.12, 128/203.25

[56] References Cited

U.S. PATENT DOCUMENTS

| | | |
|---|---|---|
| 3,644,625 | 2/1972 | Schoettger . |
| 3,876,773 | 8/1975 | Bracken . |
| 4,546,794 | 10/1985 | Ball ............................ 128/203.12 X |
| 4,554,916 | 11/1985 | Watt ............................. 128/203.12 |

FOREIGN PATENT DOCUMENTS 51-103000 10/1976 Japan .
58-013336 1/1983 Japan .

*Primary Examiner*—Gerald A. Michalsky
*Attorney, Agent, or Firm*—Saidman, Sterne, Kessler & Goldstein

[57] ABSTRACT

An improved method for anesthetizing aquatic animals which comprises anesthetizing the animals in water with nitrous oxide and carbon dioxide.

10 Claims, 2 Drawing Sheets

METHOD FOR ANESTHETIZING AQUATIC ANIMALS

FIELD OF THE INVENTION

The present invention relates to a novel method for anesthetizing aquatic animals. More particularly, the method of the present invention utilizes a combination of nitrous oxide and carbon dioxide and is applicable to transport of live fish and other valuable aquatic animals, selection of cultivated fry, adjustment of spawning seasons of fish and the like.

BACKGROUND OF THE INVENTION

Hitherto, as a method for transporting live fish and the like, there has been mainly employed such a method that they are put in a water tank having a large volume and are transported with the entire tank. However, this method requires a high transport cost and, in order to reduce the cost, various methods have been tried. For example, lots of fish are transported in sea water or fresh water with cooling by addition of ice or the like to lower movements of fish and to make the range of their movements small. Or, several bamboo baskets each of which contains one fish are piled up and the entire baskets are placed in sea water or fresh water to limit movements of fish.

Further, in Japanese Patent Kokai No. 51-103000, there is described a method for transporting fish wherein fish are anesthetized with an anesthetic and cooled in a water tank, and then transferred into another water tank containing no anesthetic. In "Possibility of Applying Anesthesia by Carbon Dioxide in the Transportation of Live Fish", Bull. Jap. Soc. Sci. Fish, 49 (5), 725-731 (1983), there is described a method using $NaHCO_3$ and an acid as well as a method employing aeration with $CO_2$ and $O_2$.

On the other hand, in the selection of fry, there has been known a method wherein fry are anesthetized by bubbling $CO_2$ gas through sea water to lower pH. Among fry, there are malformed fry having no or deformed bladders by nature, which frequently results in shape abnormality after grown up. Accordingly, they should be thinned out at the initial stage of cultivation. However, there is no difference between the ordinary state of movements of malformed fry and that of normal fry, and it is very difficult to differentiate such malformed fry from normal fry by appearance. Provided that, when fry are anesthetized, there is observed such a phenomenon that normal fry rise to the surface with facing their bladders upward, while malformed fry sink below the water. Thereby, whether fry are normal or abnormal can be readily judged, and the selection of fry can be readily conducted. In this known method, $CO_2$ is bubbled into sea water to lower pH to the critical value (usually 5.6) or lower to anesthetize fish forcibly.

In this conventional aeration with $CO_2$, it is known that, when pH drops to a certain critical value, fish show vigorous swimming motions just before they are put under anesthesia, although it is varied according to kinds of fish. This is known as a so-called "exaltation phase at initial stage under anesthesia". As described in the above Bull. Jap. Sci. Fish, 49 (5), in general, when a drug is effected on fish, the following stages are usually observed in order according to the degree of intensity of its activity.

(1) Fish show vigorous swimming motions with so-called "surfacing" like behavior.

(2) Fish response to stimulation becomes very weak but fish keep their balance. Respiration movements are deep and hard.

(3) Fish lose their balance and lie on their sides to almost repose. Respiration movements are deep and hard.

(4) Fish lie on their sides in repose. Respiration movements are light and hard.

(5) Fish lie on their sides in repose. Respiration movements are irregular.

(6) Fish lie on their sides in repose. Respiration movements cease to die.

These have been also confirmed by the present inventors' experiments and, when fish show vigorous swimming motions, sometimes, they jump up about 30 cm or more above the water and often damage themselves by hitting against the edge or wall of a water tank. It is clear that this decreases in value of live fish, and therefore, this stage is a problem in anesthesia of fish. However, it is considered that this stage is unavoidable in a method of anesthetizing fish by aeration with $CO_2$.

When transporting live fish, it is necessary to maintain fish in the state of the above (3) and, in addition, it is desirable to directly introduce fish to the above state (3) without passing through the above states (1) and (2). Accordingly, in transporting live fish, the above various methods have been tried. However, they are still insufficient because, in the method using an anesthetic, it is required to keep a water temperature low or, in $CO_2$ aeration, the above damage of fish is unavoidable. Therefore, the above methods are not widely employed in practice. Particularly, in the case of very valuable high grade marketable fish such as red sea bream or aquarium fish such as colored carp, $CO_2$ aeration can not be employed in practice because, as described above, fish are liable to be damaged by this method and damage in these kinds of fish remarkably reduces their value. Therefore, it has been requested in this field to develop a method for anesthetizing fish without damage thereof.

Besides fish, the similar problems are present in transporting other aquatic animals such as squids, cuttlefish, octopuses, prawns, lobsters, crabs and other valuable high grade aquatic animals because there is a remarkable difference in commercial values between transporting them with keeping alive and transporting them without keeping alive such as frozen products. Therefore, it is desirable to transport them with keeping alive. Particularly, when squids or octopuses are transported by putting them in a water tank, there is such a problem that they hit their heads against the wall of the tank to die, or show vigorous swimming motions and eject ink to contaminate water. This requires cleaning means such as filtration or adsorption means. Thereby, an additional cost is required and, further, a yield is lowered.

OBJECTS OF THE INVENTION

The present inventors have studied intensively to solve the above problems in a conventional anesthetizing method of fish. As the result, it has been found that, when aeration with nitrous oxide ($N_2O$) is combined with aeration with $CO_2$, fish are anesthetized without passing through an "exaltation phase at initial stage under anesthesia", i.e., without damage due to vigorous swimming motions. The "combination of aeration with $N_2O$ and aeration with $CO_2$" includes simultaneous bubbling of $N_2O$ and $CO_2$ into water containing fish from separate gas sources. Alternatively, a mixed gas of $N_2O$ and $CO_2$ can be bubbled into water containing fish, or fish can be put in water into which $N_2O$ and $CO_2$ has been previously bubbled. Or, fish can be put in water into which $N_2O$ has been previously bubbled and then $CO_2$ is bubbled into water. In brief, the "combination" means the use of both $N_2O$ and $CO_2$ in water until fish are put under anesthesia.

Further, it has been also found that this combined aeration with nitrous oxide and $CO_2$ is effective for anesthetizing not only fish, i.e., aimals belonging to the class Pisces but also all other aquatic animals including animals belonging to the classes Cephalopoda, Pelecypoda, and Crustacea.

That is, the main object of the present invention is provide a novel method for anesthetizing aquatic animals which can be readily practiced at a low cost with minimizing problems in a conventional method such as damage of the animals.

This object as well as other objects and advantages of the present invention will become apparent to those skilled in the art from the following description by reference to accompaying drawings.

SUMMARY OF THE INVENTION

Figure 1:
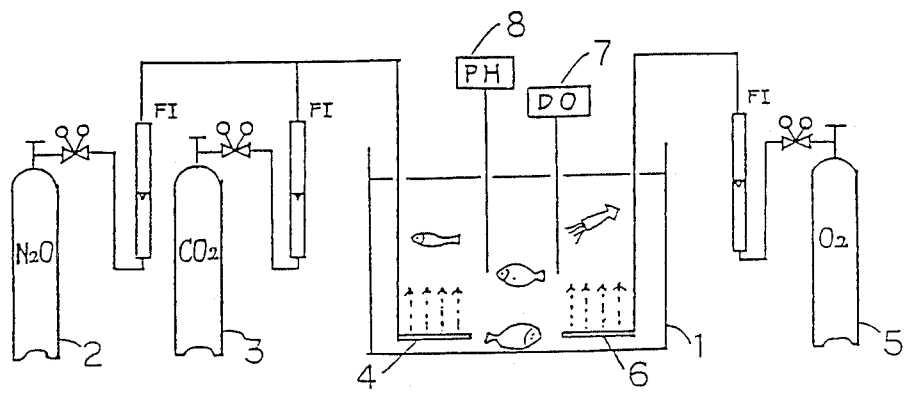
FIG. 1 is a schematic diagram illustrating one embodiment of the method of the present invention as described in Example 1 hereinafter.

According to the present invention, there is provided a method for anesthetizing aquatic animals which comprises anesthetizing the animals in water with nitrous oxide and carbon dioxide. More paricularly, the method of the present invention characterized by anesthetizing aquatic animals in water with carbon dioxide in the presence of nitrous oxide.

In comparison with a conventional method using an anesthetic or $CO_2$ aeration, the method of the present invention can effectively anesthetize aquatic animals by a simple operation. Further, in the method of the present invention, damage of animals due to vigorous swimming motions before they are put under anesthesia can be minimized and animals are readily awakened from anesthesia by putting into fresh sea water or water preferably enriched with oxygen. As the result, it is possible to markedly reduce transport cost or cost for the selection of fry.

DETAILED DESCRIPTION OF THE INVENTION

In the method of the present invention, aquatic animals are anesthetized by bubbling a gas or gases containing $N_2O$ and $CO_2$ into water containing the animals through one or more aeration pipes such as those having a sintered glass tip or an air stone tip to absorb them into water.

Regarding the effects of $N_2O$ and $CO_2$ on aquatic animals, it is considered that $N_2O$ exerts sedative activity and $CO_2$ exerts anesthetic activity. It is impossible to anesthetize animals without vigorous swimming motions only by either of the above activities. When the both activities are combined, aquatic animals can be anesthetized for the first time without vigorous swimming motions as the result of their synergism. This has not been found heretofore in the prior art and is one of important advantages of the present invention. Although it is well known that $N_2O$ is an anesthetic gas and is often used in an operation of the human body, there is no case that $N_2O$ is applied to an aquatic animal. That is, according to the method of the present invention, $N_2O$ is firstly applied to aquatic animals in combination with $CO_2$.

The aquatic animals to which the method of the present invention is applied is so-called primary aquatic animals which are cold blooded animals living in water and respiring dissolved oxygen. Particularly, the method of the present invention is preferably applied to very valuable high grade marketable animals from the economical point of view. Examples of such animals include those belonging to the class Pisces such as salmon, trout, char, ayu, carp, crucian carp, goldfish, roach, whitebait, eel, conger eel, sardine, flying fish, sea bass, sea bream, parrot bass, snapper, mackerel, horse mackerel, tuna, bonito, yellowtail, rockfish, fluke, sole, flounder, blowfish, filefish, etc.; those belonging to the class Cephalopoda such as squid, cuttlefish, octopus, etc.; those belonging to the class Pelecypoda such as clam, scallop, ark shell, oyster, etc.; those belonging to the class Gastropoda such as turban shell, abalone, etc.; and those belonging to the class Crustacea such as lobster, prawn, shrimp, crab, squilla, etc.

By appropriately selecting conditions such as a flow rate of gas to be bubbled, a ratio of $N_2O$ to $CO_2$, an aeration time and the like according to kinds and size of animals to be applied, desired sedative activity of $N_2O$ and anesthetic activity of $CO_2$ can be exerted to obtain a desired effect of the present invention. Although such conditions are varied according to size of a water tank, one standard for conditions in the anesthetizing method of the present invention is as follows. When anesthetizing sea bream (*Chrysophrys major*) having 1 kg of body weight in a 650 liter water tank, $N_2O$ and $CO_2$ are bubbled into sea water at the flow rates of 10 liter/min. and 1 liter/min., respectively, for 20 minutes or more to bring pH to 6.0 or lower. Thereby, sea bream is anesthetized calmly.

The method of the present invention can be carried out, for example, by putting aquatic animals such as fish in a water tank and bubbling $N_2O$ and $CO_2$ into water from different nozzles simultaneously under the above conditions, or by preparing a mixed gas of $N_2O$ and $CO_2$ and bubbling the mixed gas into water from one nozzle. Alternatively, it is possible to put aquatic animals in a water tank into which $N_2O$ and $CO_2$ have been previously bubbled. Further, it is possible to firstly bubble $N_2O$ and then $CO_2$ into water, or to put aquatic animals in a water tank into which $N_2O$ has been previously bubbled for a certain period of time and then transfer the animals to another water tank into which $CO_2$ is bubbled. These are appropriately selected according to a particular use of the method of the present invention. That is, in the method of the present invention, it is necessary that sufficient sedative activity by $N_2O$ should be exerted on aquatic animals before exertion of anesthetic activity by $CO_2$ due to lowering of pH of water. In other words, the aeration ratio of $N_2O$ to $CO_2$ is of importance in the case that aeration is carried out simultaneously, or the mixing ratio of $N_2O$ and $CO_2$ is of importance in the case that a mixed gas is used.

Although the optimum ratio of $N_2O$ to $CO_2$ is varied according to kinds of aquatic animals, difference between individuals, water temperature and the like, in general, the ratio of $CO_2:N_2O$ is in the range of, preferably, 1:1 to 1:100, more preferably, 1:8 to 1:30. Even if $N_2O$ is increased more than this range, no more sedative effect before exertion of anesthetic activity by $CO_2$ can be expected and therefore it is disadvantage from the economical point of view. On the other hand, when $CO_2$ is increased, pH is dropped to the prescribed point before exertion of sedative effect by $N_2O$, which results in the "exaltation phase at initial stage under anesthesia" of the animals to cause vigorous swimming motions. This is undesirable.

Particularly, in the case of anesthetization of sea bream, blowfish, flounder, lobster and the like, aeration is carried out at the $CO_2:N_2O$ ratio of 1:8 to 1:10 until pH becomes 6.2 to 5.8. In the case of anesthetization of yellowtail, filefish, squid and the like, aeration is carried out at the $CO_2:N_2O$ ratio of 1:10 to 1:30 until pH becomes 6.8 to 6.3. Thereby, it is possible to exert desired sedative and anesthetic activities smoothly.

By the way, dissolved oxygen may be decreased by bubbling of these gases into water to cause an oxygen deficit state, which results in weakening of the animals. Therefore, it is desired to also bubble oxygen into water in such a manner that dissolved oxygen in water is kept in a concentration of not less than 5 ppm, for example, by monitoring the concentration with a dissolved oxygen (DO) meter.

The method of the present invention can be carried out at ambient temperature and cooling of water is not required.

In order to awaken the animals from anesthesia, for example, fish under anesthesia are transferred to another water tank into which $N_2O$ and $CO_2$ are not bubbled. Preferably, at this stage, oxygen is bubbled into water to increase dissolved oxygen. Thereby, fish can be readily awakened from anesthesia within a short period of time, for example, several minutes to several ten minutes.

The following Examples further illustrate the present invention in detail but are not to be construed to limit the scope thereof.

EXAMPLE 1

In this Example, anesthetization is carried out by using an apparatus as shown in FIG. 1.

In the apparatus of FIG. 1, $N_2O$ gas and $CO_2$ gas are bubbled into a sea water tank (1) containing aquatic animals from a $N_2O$ bomb (2) and $CO_2$ bomb (3) each of which has a control valve and a flowmeter through an aeration pipe (4). $O_2$ gas is also bubbled from a $O_2$ bomb (5) through an aeration pipe (6). The tank (1) is equipped with a DO meter (7) and a pH meter (8) to monitor pH and DO conditions.

About 600 liter of sea water was filled in the 650 liter tank (1), and two yellowtails (*Seriola quinqueradiata*, about 5 kg of body weight), two sea breams (*Chrysophrys major*, about 1 kg of body weight) and two flounders (*Paralichtys olivaceus*, about 700 g of body weight) were put in the tank. The tank was aerated with 10 liter/min. of $N_2O$ and 1 liter/min. of $CO_2$ as well as $O_2$ with monitoring DO meter (7) so as to keep dissolved oxygen at a concentration of at least 7 to 8 ppm. Behavior of fish were observed according to change of pH. The initial pH of sea water was 7.8 to 7.9 and the initial water temperature was 20° C. The relation between aeration time, pH and DO is shown in Table 1.

TABLE 1

| Time (min.) | 0 | 5 | 6 | 8 | 10 | 15 | 19 | 22 | 25 |
|---|---|---|---|---|---|---|---|---|---|
| pH | 7.8 | 7.0 | 6.5 | 6.4 | 6.3 | 6.1 | 6.0 | 6.0 | 6.0 |
| DO (ppm) | 5.1 | 6.5 | 6.9 | 7.0 | 7.3 | 7.9 | 8.2 | 8.3 | 8.6 |

From immediatley after commencement of aeration, among the fish, yellowtails began to show "surfacing". After 6 minutes, one of yellowtails was put under anesthesia at pH about 6.5 and the other one was also put under anesthesia at pH 6.3 after 10 minutes. They rose to the surface with lying on their backs. Regarding sea breams, after 15 minutes, they showed "surfacing" at pH about 6.1 and, after 19 minutes, two sea breams were put under anesthesia at pH about 6.0. They lay on their sides and rose to the surface. Regarding flounders, since they lay on the bottom of the tank without significant motions from the beginning of aeration, it was difficult to confirm when they were put under anesthesia. However, it was considered that they were put under anesthesia at pH about 6.0 because, when they were pecked with a stick and turned over at this pH, they did not return to the original positions.

EXAMPLE 2

About 350 liter of sea water was filled in the 400 liter tank as shown in FIG. 1 and two filefishes (*Stephanolepis cirrhifer*, about 20 cm of body length), two squid (*Dorytenthis kensaki*, about 20 cm of body length) and two lobsters (*Panulirus japonicus*, about 20 cm of body length) were put in the tank. The tank was aerated with 8 liter/min. of $N_2O$ as well as $CO_2$ with adjusting the flow rate in the range of 0.35 to 1.5 liter/min. according to pH drop. $O_2$ was also continuously bubbled into sea water with monitoring by DO meter (7) so as to keep dissolved oxygen at a concentration of at least 7 to 8 ppm. The initial pH of sea water was 8.0 and the initial water temperature was 19.5° C. The changes of the flow rate, pH and DO are shown in Table 2.

TABLE 2

| Time (min.) | 0 | 4 | 7 | 9 | 14 | 25 | 34 | 50 | 56 |
|---|---|---|---|---|---|---|---|---|---|
| $N_2O$ (liter/min) | 8.0 | 8.0 | 8.0 | 8.0 | 8.0 | 8.0 | 8.0 | 8.0 | — |
| $CO_2$ (liter/min) | 1.0 | 0.35 | 0.35 | 0.35 | 0.35 | 1.0 | 1.5 | 1.5 | — |
| pH | 8.0 | 7.1 | 7.0 | 6.8 | 6.7 | 6.7 | 6.4 | 6.0 | 5.9 |
| DO (ppm) | 9.7 | 10.9 | 10.6 | 10.3 | 8.6 | 14.1 | 8.6 | 7.5 | 12.0 |

After 4 minutes from commencement of aeration, filefishes began to show "surfacing" at pH of about 7.1. The body color became reddish and, after 9 minutes, they rose to the surface at pH about 6.8. After 14 minutes, they were completely put under anesthesia without vigorous swimming motions. Regarding squids, after 7 minutes, one of them rose to the surface at pH 7.0 and put under anesthesia with closing eyes. The other one was also put under anesthesia calmly after 14 minutes without vigorous swimming motion or ejection of ink. Regarding lobsters, after 14 minutes, they began to show such behavior that they moved backward with enfolding their tails under abdomens, which is characteristic of anesthetic effect, at about 6.4. After 56 minutes, it was confirmed that they were put under anesthesia calmly at pH of about 5.9.

EXAMPLE 3

The same tank as used in Example 1 was used and two sea breams (1 kg of body weight) and two flounders (700 g of body weight) were put in the tank in which $N_2O$ and $CO_2$ had been previously dissolved. The pH of sea water was 6.0 and dissolved oxygen was 8.8 to 9.0 ppm.

As the results, it was confirmed that sea breams were put under anesthesia after 2 to 3 minutes and flounders were put under anesthesia after 3 to 5 minutes. All fish did not show vigorous swimming motions.

When the aquatic animals put under anesthesia in the above Examples 1 to 3 were transferred into ordinary sea water adjusted to DO of at least 7 to 8 ppm only by aeration with $O_2$, all of them completely awakened from anesthesia within 3 to 5 minutes, although there were individual differences.

No animal died in these anesthetization experiments under the proper pH and DO conditions.

EXAMPLE 4

Figure 2:
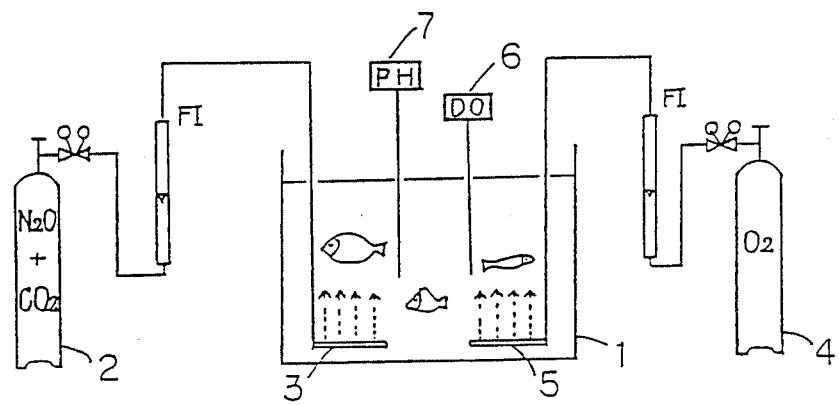
FIG. 2 is a schematic diagram illustrating another embodiment of the method of the present invention as described in Example 4 hereinafter.

In this Example, anesthetization is carried out by using an apparatus as shown in FIG. 2.

In the apparatus of FIG. 2, a mixed gas of $N_2O$ and $CO_2$ are bubbled into a sea water tank (1) containing aquatic animals from a mixed gas bomb (2) having a control valve and a flowmeter through an aeration pipe (3). $O_2$ gas is also bubbled from a $O_2$ bomb (4) through an aeration pipe (5). The tank (1) is equipped with a DO meter (6) and a pH meter (7) to monitor pH and DO conditions.

Sea water was filled in the tank (1) having the inner volume of about 1.5 m³ and three sea breams (about 1.5 kg of body weight) and three blowfishes (*Fugu rubripes*, about 500 g of body weight) were put in the tank. The tank was aerated with 30 liter/min. of a mixed gas of $CO_2$ (10%) and $N_2O$ (90%). $O_2$ gas was also bubbled into sea water with monitoring DO meter (6) so as to keep dissolved oxygen at a concentration of at least 10 ppm.

After 30 minutes, one sea bream rose to the surface lying on its back at pH about 6.2 and it was confirmed that it was put under anesthesia. Thereafter, the fish were put under anesthesia one after another calmly and, after 40 minutes, all fish were put under anesthesia at pH of about 6.0 without vigorous swimming motions.

Then, aeration with the mixed gas of $N_2O$ and $CO_2$ was discontinued. While a small amount of $O_2$ was bubbled so as to keep the concentration of DO of at least 7 to 8 ppm, the entire water tank was transported about 150 km distance over 4 hours by a motor truck.

After transport, the state of each fish was scarcely different from that just after putting under anesthesia, although 4.5 hours already elapsed. When the fish were transferred into ordinary sea water aerated with only $O_2$, three blowfishes and one sea bream completely awakened from anesthesia within several minutes. The reamining two sea breams completely awakened from anesthesia after several ten minutes, although they showed "surfacing" like behavior.

EXAMPLE 5

Various kinds of aquatic animals were put in each water tank as shown in FIG. 1 (A: 1.5 m³, B: 650 liter, C: 400 liters, D: 100 liter) and experiments were carried out according to the same manner as described in Example 1. The results are shown in Table 3.

As seen from Table 3, the method of the present invention is useful for anesthetizing various aquatic animals.

TABLE 3

| Animals | Size Length (cm) | Size Weight (kg) | Ratio of $CO_2$:$N_2O$ | pH at initial anesthetization stage | Time required for anesthetization (min.) | Tank |
| --- | --- | --- | --- | --- | --- | --- |
| Pisces | | | | | | |
| sea bream (*Chrysophrys major*) | 30 | 1.0–1.5 | 1:8–1:10 | 5.8–6.2 | 10–20 | A, B |
| flounder (*Paralichtys olivaceus*) | 30 | 0.7 | 1:8–1:10 | 5.8–6.2 | 10–20 | B, C |
| yellowtail (*Seriola quinqueradiata*) | 50–60 | 3–5 | 1:10–1:30 | 6.3–6.8 | 15–25 | A, B |
| filefish (*Stephanolepis cirrhifer*) | 15 | 0.2 | 1:10–1:30 | 6.3–6.8 | 5–10 | C |
| mackerel (*Scomber japonicus*) | 25 | 0.5 | 1:8–1:10 | 6.0–6.5 | 20–30 | D |
| horse mackerel (*Trachurus japonicus*) | 20 | 0.2 | 1:8–1:10 | 6.0–6.5 | 10–20 | D |
| scorpion fish (*Sebastiscus marmoratus*) | 20 | 0.3 | 1:8–1:10 | 6.3–6.8 | 10–20 | D |
| sardine (*Sardinops melanosticta*) | 15 | 0.1 | 1:8–1:10 | 6.3–6.8 | 10–20 | D |
| blowfish (*Fugu rubripes*) | 20 | 0.5 | 1:8–1:10 | 5.8–6.2 | 10–20 | A |
| carp (*Cyprinus carpio*) | 20 | 0.7 | 1:8–1:10 | 4.3–4.5 | 30–60 | D |
| crucian carp (*Carassius auratus*) | 15 | 0.5 | 1:8–1:10 | 3.5–4.5 | 30–60 | D |
| ayu (*Plecoglossus altivelis*) | 15 | 0.2 | 1:8–1:10 | 4.5–5.0 | 30–40 | D |
| goldfish | 5 | — | 1:8–1:10 | 3.5–4.5 | 30–60 | D |
| Cephalopoda | | | | | | |
| squid (*Dorytenthis kensaki*) | 20 | 0.3 | 1:10–1:30 | 6.3–6.8 | 10–20 | C |
| octopus (*Octopus vulgaris*) | 20 | 0.3 | 1:10–1:30 | 6.3–6.8 | 10–20 | C |

TABLE 3-continued

| Animals | Size Length (cm) | Size Weight (kg) | Ratio of $CO_2:N_2O$ | pH at initial anesthetization stage | Time required for anesthetization (min.) | Tank |
|---|---|---|---|---|---|---|
| Crustacea |  |  |  |  |  |  |
| lobster (*Panulirus japonicus*) | 20 | 0.3 | 1:8–1:10 | 5.6–6.0 | 20–30 | C |
| prawn (*Penaeus japonicus*) | 15 | — | 1:8–1:10 | 5.8–6.2 | 20–30 | C |
| swimming crab (*Neptunus trituberculatus*) | 15 | — | 1:8–1:10 | 5.8–6.2 | 20–30 | C |
| river crab (*Potamon dehaani*) | 5 | — | 1:8–1:30 | 5.8–6.2 | 15–25 | D |

EXAMPLE 6

Figure 3:
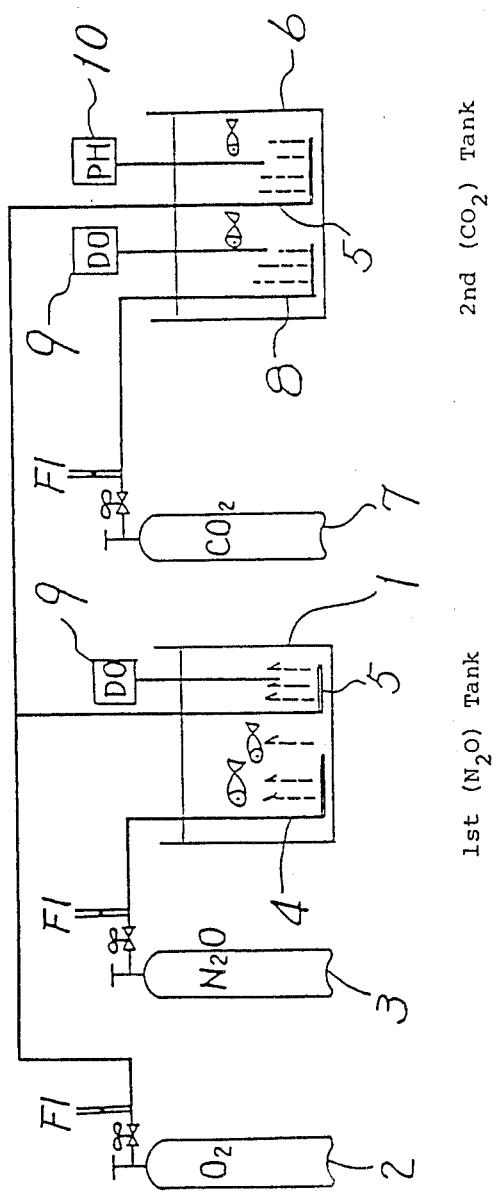
FIG. 3 is a schematic diagram illustrating still another embodiment of the method of the present invention as described in Example 6 hereinafter.

In this Example, anesthetization is carried out by using an apparatus as shown in FIG. 3.

In the apparatus of FIG. 3, $O_2$ gas and $N_2O$ gas are bubbled into a 1st water tank (1) containing fry from an $O_2$ bomb (2) and a $N_2O$ bomb (3), each of which has a control valve and a flowmeter, through aeration pipes (5) and (4), respectively. Likewise, $O_2$ gas and $CO_2$ gas are bubbled into a 2nd water tank (6) from the above $O_2$ bomb (2) and a $CO_2$ bomb (7) through aeration pipes (5) and (8), respectively. The 1st tank (1) is equipped with a DO meter (9) and the 2nd tank (6) is equipped with a DO meter (9) and a pH meter (10) to monitor pH and DO conditions.

Ten sea bream fry (about 10 cm of body length) were put in the 1st tank filled with 30 liter of sea water at a temperature of 23° C. at pH 8.0. $O_2$ gas was intermittently bubbled into the tank so as to keep 5 ppm of dissolved oxygen by monitoring with the DO meter. Then, $N_2O$ gas was bubbled into the tank at the flow rate of 1.5 liter/min until sedative effect on the fry was exerted. As the result of aeration with $N_2O$, after 15 minutes, initial effect of $N_2O$ was exerted and relatively active swimming motions was observed in comparison with a control group of fry in an ordinary water tank. After 20 minutes, the fry began to rise to the surface and thereby sedative effect of $N_2O$ was confirmed. That is, the fry put their heads down and their tail fins up and, following the ascending current due to bubbling from the aeration pipes, they rose to the surface. Then, they intended to sink toward the bottom by themselves. They repeated these motions several times. Thereafter, some of them laid on their sides. However, they were not put under anesthesia only by aeration with $N_2O$ gas.

After bubbling $N_2O$ gas at the flow rate of 1.5 liter/min. for 35 minutes, the fry were transferred to the 2nd tank. In the 2nd tank, $CO_2$ was bubbled at the flow rate of 1.0 liter/min. for about 3 minutes to lower pH of sea water from 8.0 to 5.9. As the result, all the fry were calmly put under anesthesia without vigorous swimming motions as observed in the control group which was not treated with $N_2O$.

EXAMPLE 7

By using the same apparatus used in Example 6, $N_2O$ gas was bubbled into the 1st tank at the flow rate of 1.5 liter/min. for 35 minutes. Then, ten sea bream fry were put therein and allowed to stand for 20 minutes. Thereafter, the fry were transferred into the 2nd tank into which $CO_2$ gas had been bubbled at the flow rate of 1.0 liter/min. for about 3 minutes to lower pH to 5.9. As the result, after 1.5 minutes, one fry showed vigorous swimming motion. However, after 3 minutes, all fry were put under anesthesia.

COMPARATIVE EXAMPLE

About 350 liter of sea water was filled in the 400 liter tank (1) as shown in FIG. 1 and, according to the same manner as described in Example 1, two yellowtails (about 5 kg of body weight), two sea breams (about 1 kg of body weight) and two flounders (about 700 g of body weight) were put in the tank. Only $CO_2$ was bubbled into the tank at the flow rate of 1.5 liter/min. $O_2$ was also bubbled into the tank small poritons by monitoring with DO meter. Behavior of fish were observed according to change of pH by comparing with the results in Example 1. The relation of aeration time, pH and DO is shown in Table 4.

TABLE 4

| Time (min.) | 0 | 2 | 3 | 5 | 7 | 10 |
|---|---|---|---|---|---|---|
| pH | 6.7 | 6.1 | 6.0 | 5.8 | 5.6 | — |
| DO (ppm) | 6.0 | 6.3 | 6.8 | 6.9 | 6.6 | — |

From immediatey after commencement of aeration, all fish began to show "surfacing" and vigorous swimming motions. Particularly, yellowtails jumped up from the tank and were not put under anesthesia, even pH dropped to the prescribed value. At about pH 5.8, all fish were put under anesthesia. However, yellowtails were damaged such as bleeding from the gills and, when they were transferred to ordinary sea water at the end of the experiment, one of yellowtails did not awaken from anesthesia and died.

What is claimed is:

1. A method for anesthetizing aquatic animals which comprises anesthetizing the animals in water with nitrous oxide and carbon dioxide.

2. A method according to claim 1, wherein nitrous oxide and carbon dioxide are bubbled into water simultaneously.

3. A method according to claim 1, wherein a mixed gas of nitrous oxide and carbon dioxide is bubbled into water.

4. A method according to claim 1, wherein the animals are put in water into which nitrous oxide and carbon dioxide have been previously bubbled.

5. A method according to claim 1, wherein the animals are put in water into which nitrous oxide is bubbled and then they are transferred to another water into which carbon dioxide is bubbled.

6. A method according to claim 1, wherein the animals are put in water into which nitrous oxide has been previously bubbled and then they are transferred to another water into which carbon dioxide has been previously bubbled.

7. A method according to claim 1, wherein the animals is those belonging to the class Pisces.

8. A method according to claim 1, wherein the animals is those belonging to the class Cephalopoda or Pelecypoda.

9. A method according to claim 1, wherein the animals is those belonging to the class Crustacea.

10. A method according to claim 1, wherein the ratio of $CO_2:N_2O$ is in the range of 1:1 to 1:100.

* * * * *